US011262899B2

(12) United States Patent
Wallington

(10) Patent No.: US 11,262,899 B2
(45) Date of Patent: Mar. 1, 2022

(54) METHOD FOR ESTABLISHING A FUNCTIONAL RELATIONSHIP BETWEEN INPUT AND OUTPUT FUNCTIONS

(71) Applicant: LEGO A/S, Billund (DK)

(72) Inventor: Oliver Wallington, Vejle (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 15/509,648

(22) PCT Filed: Sep. 7, 2015

(86) PCT No.: PCT/EP2015/070378
§ 371 (c)(1),
(2) Date: Mar. 8, 2017

(87) PCT Pub. No.: WO2016/037978
PCT Pub. Date: Mar. 17, 2016

(65) Prior Publication Data
US 2017/0242574 A1    Aug. 24, 2017

(30) Foreign Application Priority Data
Sep. 10, 2014 (DK) .......................... PA 2014 70558

(51) Int. Cl.
*G06F 3/04847* (2022.01)
*G06F 8/34* (2018.01)
(Continued)

(52) U.S. Cl.
CPC ...... *G06F 3/04847* (2013.01); *G06F 3/04845* (2013.01); *G06F 8/34* (2013.01); *G06F 3/0488* (2013.01); *G06F 2203/04803* (2013.01)

(58) Field of Classification Search
CPC .... G06F 8/34; G06F 3/04817; G06F 3/04847; G06F 3/04845; G06F 3/0488; G06F 2203/04803
See application file for complete search history.

(56) References Cited

U.S. PATENT DOCUMENTS 6,173,208 B1    1/2001 Park et al.
2006/0226298 A1* 10/2006 Pierson .................. A63H 19/24
246/1 R
(Continued)

FOREIGN PATENT DOCUMENTS

CN    101682529 A    3/2010
CN    103476145 A    12/2013
(Continued)

OTHER PUBLICATIONS

International Search Report in related application No. PCT/EP2015/070377, dated Oct. 30, 2016.
(Continued)

*Primary Examiner* — Keith D Bloomquist
(74) *Attorney, Agent, or Firm* — Day Pitney LLP; Valeriya Svystun

(57) ABSTRACT

A method for establishing, by a processing device, a functional relation between a control input and a controllable function, the method comprising, by the processing device: providing a graphical user interface including a display area; positioning a first user-interface element at a first position within the display area, the first user-interface element representing a control input; positioning a second user-interface element at a second position within the display area, at a distance from the first user-interface element; the second user-interface element representing a controllable function of the electronic device; causing issuing, responsive to said control input, a control command for controlling the controllable function; wherein the control command is a function of the first and second positions relative to another.

7 Claims, 10 Drawing Sheets

(51) Int. Cl.
 *G06F 3/04845* (2022.01)
 *G06F 3/0488* (2022.01)

(56) References Cited

U.S. PATENT DOCUMENTS

| | | |
|---|---|---|
| 2006/0262146 A1 | 11/2006 | Koivisto et al. |
| 2007/0039034 A1* | 2/2007 | Sokol .......... H04N 21/233 725/117 |
| 2008/0125038 A1 | 5/2008 | Yuval |
| 2008/0242220 A1 | 10/2008 | Wilson et al. |
| 2009/0103502 A1 | 4/2009 | Ikeda |
| 2009/0322755 A1 | 12/2009 | Holm-Peterson et al. |
| 2010/0185681 A1* | 7/2010 | Han ............ G06F 3/04812 707/802 |
| 2010/0229120 A1 | 9/2010 | Inoue et al. |
| 2010/0315225 A1 | 12/2010 | Teague |
| 2011/0053558 A1 | 3/2011 | Teague |
| 2011/0058662 A1* | 3/2011 | Yoakum ............ H04M 3/568 379/202.01 |
| 2011/0115821 A1 | 5/2011 | Huang et al. |
| 2011/0263235 A1 | 10/2011 | Kassiedass |
| 2012/0169620 A1 | 7/2012 | Bowler, II |
| 2012/0304093 A1* | 11/2012 | Magnusson .......... G06F 9/451 715/769 |
| 2013/0045678 A1 | 2/2013 | Lee |
| 2013/0227473 A1* | 8/2013 | Corvo ............ G05B 19/409 715/799 |
| 2014/0035607 A1 | 2/2014 | Heydron et al. |
| 2014/0040792 A1* | 2/2014 | Kodosky .......... G06F 3/0481 715/762 |
| 2014/0365060 A1 | 12/2014 | Yamamoto et al. |
| 2015/0177362 A1 | 6/2015 | Gutierrez et al. |
| 2015/0373484 A1 | 12/2015 | Lee et al. |

FOREIGN PATENT DOCUMENTS

| | | |
|---|---|---|
| CN | 103575329 A | 2/2014 |
| EP | 1033863 A1 | 9/2000 |
| EP | 2169492 A1 | 3/2010 |
| EP | 2434721 A1 | 3/2012 |
| EP | 2611125 A1 | 7/2013 |
| EP | 2634723 A1 | 9/2013 |
| EP | 2720444 A1 | 4/2014 |
| JP | 2008027398 A | 2/2008 |
| WO | 1996/035989 A1 | 11/1996 |
| WO | 2009/047225 A1 | 4/2009 |
| WO | 2009/105115 A2 | 8/2009 |

OTHER PUBLICATIONS

International Preliminary Report on Patentability in related application No. PCT/EP2015/070377, dated Nov. 3, 2016.
Written Opinion of the International Searching Authority in related application No. PCT/EP2015/070377, dated Oct. 30, 2016.
Written Opinion of the International Searching Authority in corresponding application No. PCT/EP2015/070378, dated Oct. 26, 2015.
International Preliminary Report on Patentability with Reply and amended claim sheets in corresponding application No. PCT/EP2015/070378, dated Oct. 13, 2016.
International Search Report in corresponding application No. PCT/EP2015/070378, dated Oct. 26, 2015.
Non-Final Office Action issued in related U.S. Appl. No. 15/509,619, dated Oct. 17, 2018.
Final Office Action issued in related U.S. Appl. No. 15/509,619, dated Apr. 11, 2019.
First Office Action with Search Report issued in corresponding Chinese Patent Application No. 201580060864.5, dated Dec. 12, 2019.
English Translation of First Office Action issued in related Chinese patent application No. CN 201580060865.X, dated Aug. 23, 2019.

* cited by examiner

FIG. 27A - PRIOR ART

METHOD FOR ESTABLISHING A FUNCTIONAL RELATIONSHIP BETWEEN INPUT AND OUTPUT FUNCTIONS

CROSS-REFERENCE TO RELATED APPLICATIONS

This application is a U.S. National Stage of International Application No. PCT/EP2015/070378 filed on 07 Sep. 2015 and published on 17 Mar. 2016, as WO 2016/037978 A1, which claims the benefit of priority to Danish Patent Application No. PA 2014 70558, filed on 10 Sep. 2014.

FIELD OF THE INVENTION

The invention relates to a method for user-controlled establishment of a functional relationship between an input function and an output function.

BACKGROUND

Electronic devices that provide various forms of inputs and/or outputs and that provide mechanisms which allow certain input behaviour to influence certain output behaviour have been known for decades.

Inputs and outputs can be integrated into a single electronic device such that the device provides a complete and self-contained functional purpose. Additionally, inputs, outputs and process functions may be split or combined across multiple physically separate electronic devices. A wired or wireless connection may then be used between the devices so as to provide a functional relationship between the inputs, outputs and process functions implemented by the different devices.

WO 2009/047225 discloses a toy construction system comprising function construction elements and a data processing system which provides a programming environment for generating commands for controlling the function elements. This prior art system further comprises an interface element between the data processing system and the function construction element which detects the presence of function construction elements connected to the interface construction element and sends corresponding information to the data processing system. As the interface element automatically detects the connected construction elements, the programming environment can be adapted to the connected devices, e.g. so as to provide context-sensitive help, enable/disable certain functions or displays responsive to the detected construction elements etc.

Consequently, the above prior art system allows users without great experience with computer software and hardware to easily learn how to control a constructed structure from a computer. Nevertheless, it remains desirable to provide a user-configurable control system for controlling electronic device that is even easier to use and that provides easy-to-use mechanisms for establishing and configuring functional relationships between input and output functions.

SUMMARY

According to one aspect, disclosed herein are embodiments of a method for establishing, by a processing device, a functional relation between a control input and a controllable function, the method comprising, by the processing device:
  providing a graphical user interface including a display area;
  positioning a first user-interface element at a first position within the display area, the first user-interface element representing a control input;
  positioning a second user-interface element at a second position within the display area, at a distance from the first user-interface element; the second user-interface element representing a controllable function of the electronic device;
  causing issuing, responsive to said control input, a control command for controlling the controllable function;
wherein the control command is a function of the first and second positions relative to another.

Hence, embodiment of the method described herein provides an easy-to-use control mechanism allowing even untrained users to configure a control system in an intuitive manner. Embodiments of the method provide a mechanism for creating functional connections and control interfaces between inputs and output functions.

The first and second user-interface elements are positioned at a distance from another such that they do not touch or overlap another. It will be appreciated however, that the first and second user-interface elements may be connected by a connector user-interface element representing a functional connection between the control input and the controllable function. The connector user-interface element may e.g. be a line or other user-interface element having a first connecting end connectable to the first user-interface element and a second connecting end connectable to the second user-interface element.

The control command may have a variety of forms depending on the device generating the command and the device receiving the command and whether the device generating the command is the same device receiving the command or a different device; examples of control commands include but are not limited to a control message, a function call, a digital or analogue control signal, and/or the like. In some embodiments, a control command may include multiple control signals or otherwise encode multiple parameters or other quantities; for example a tilt sensor may output X, Y and Z position information. The type and/or format of a command may be influenced by the type of the device receiving the command.

The control command is a function of the relative position, i.e. it varies with varying relative position. For example, the control command may represent a control parameter controlling a property of the controllable function and a value of the control parameter may vary with varying relative position. The variation may be continuous or discontinuous e.g. step-wise.

In one embodiment, the control command is a function of the distance between the first and second positions. For example, the control command may represent a control parameter controlling a property of the controllable function and a value of the control parameter may vary with varying distance. Hence, the distance at which the user-interface elements are placed from another within the display area controls a coupling strength or other property of the functional relation between the control input and the controllable function. In some embodiments the control parameter decreases with increasing distance. The variation may be continuous or discontinuous e.g. step-wise. For example, the distance between the first and second position may be within one of a number of predetermined distance ranges and the control parameter may be set responsive to which distance range the current distance is in. The control parameter may control a magnitude or other degree of the output in response to the input. For example, the control parameter may control a speed, e.g. of a motion, a volume of sound, and intensity of light or another output, etc. Other examples of control parameters may control a frequency of a repetition, of a sound, of light or other electromagnetic radiation, etc.

Alternatively or additionally to the distance between the first and second positions, one or more other parameters representing a relative position of the first and second user-interface elements may be used to vary the control command, e.g. an angle of an axis connecting the first and second positions relative to a reference axis e.g. a boundary of the display area.

The user-interface element is a user-interface element of a graphical user interface; it may include an icon or any other graphical representation of an input function or an output function that may be positioned within a display area of a graphical user interface. In some embodiment, positioning the first and/or the second user-interface element comprises positioning the first and/or second user-interface element responsive to a received user input, e.g. a user input indicative of a selection of one of a number of user-interface elements and/or a user input indicative of the first and/or second position. For example, the user may select a user-interface element from a set of user-interface elements and position the selected user-interface element at the desired position, e.g. by means of a drag and drop operation. The display area may cover the entire area of a display or merely a sub area. The display area may be a work area, i.e. a designated display area where the user may position user-interface elements. The user-interface elements positioned within the display area, their relative positions and/or inter-connections are determined by the processing device; and the processing device causes control commands responsive to be issued so as to control selected output functions responsive to selected control inputs. Which output functions are controlled responsive to which input function and in what way is defined by the user-interface elements positioned within the display area, their interconnections and/or their respective positions within the display are relative to another.

In some embodiments, positioning the first and/or the second user-interface element within the display area comprises receiving a user input indicative of a functional connection between the control input and the controllable function, and providing an indication that the first and second user-interface elements are functionally connected with each other. For example the method may comprise connecting the first and second user-interface elements by a connector user-interface element; alternatively or additionally, the first and second user-interface elements may be represented having the same colour or otherwise represented so as to indicate a functional connection. The user input may comprise a user-controlled positioning of the connector user-interface element, a selection of the first and second user-interface elements, e.g. by clicking or touching or dragging a frame around the first and second user-interface elements, or in another suitable way.

In one embodiment, positioning the first and second user-interface elements comprises initially positioning them in a predetermined spatial relationship with each other, e.g. at the same position or touching each other, and then moving one of the first and second user-interface elements away from the other or otherwise re-positioning them such that there is a user-selected distance between their respective positions. The initial positioning may thus be detected by the processing device an establishment of a functional connection, and the subsequent re-positioning a distance from each other represents a control parameter of the functional connection between the control input and the controllable function represented by the user-interface elements.

The processing device causes the control command to be issued responsive to the control input. In particular, the control command may be issued by the processing device itself or by another device different from the processing device, e.g. an input electronic device configured to receive the control input. For example, the processing device may control or otherwise cause the external input device to issue the control command. In one embodiment, the processing device generates instructions executable by an external input device, the instructions being indicative of the control input, the controllable function and a control parameter indicative of a strength of coupling and/or of another variable property of the coupling. The processing device may then communicate the instructions to the input device for subsequent execution by the input device. The input device may then communicate the control command to the processing device or to an output device different from the processing device, the output device being operable to perform the controllable function.

The controllable function may be performed by the processing device or by an output device different from the processing device. Hence, issuing the control command may comprise communicating the control command by one device—e.g. the processing device or an external input device—to another device—e.g. to the processing device or to an external output device. Alternatively issuing the control command may comprise an internal command internal to a single device. For example, the processing device may generate the control command responsive to a control input received directly by the processing device or from an external input device; and the processing device may then control an internal function performed by the processing device or an external function performed by an external output device. Similarly the external input device and the external output device may be combined into a single external device, different from the processing device and configured to receive the control input and to perform the controllable function.

In some embodiments, the input device and/or the output device comprises an interface element of the processing device, e.g. a graphical interface element which may be present on the same display as the first and second user interface elements. The first and second user interface elements may in fact incorporate or be otherwise associated with respective input or output user interface elements and thereby create user interface elements that can include user interface input and/or output effects and their relative positions influence the coupling between the input and output effects.

In any event, issuance of the control command is performed responsive to the control input, and the issued control command is a function of the relative positions of the first and second user-interface elements within the display area of the processing device.

It will be appreciated that the first user-interface element may be representative of an input device that is operable to receive the user input. The first user-interface element may represent an input device in a variety of ways, e.g. using graphics and/or text. Similarly, the second user-interface element may be representative of an output device operable to perform the controllable function.

The processing device may be any suitably configured, e.g. programmed, electronic device comprising a display operable to provide a graphical user-interface and, optionally, a wired and/or wireless communications interface.

Examples of such devices include a computer or other data processing system, such as a handheld or otherwise portable computing device such as a smartphone, a laptop computer, a tablet computer or the like. Other examples of processing devices include an intelligent construction element of a modular construction system, e.g. a toy construction system, that comprises a display. The processing device may be configured to execute a program that causes the processing device to perform the steps of the method described herein. In particular, the processing device may be configured to provide a user-interface environment comprising a display area for positioning user-interface elements and functionality for a user-controlled positioning of user-interface elements within the display area and for establishing functional relationships between control inputs and controllable functions based on the user-controlled positioning of user-interface elements and for causing issuance of corresponding control commands. Consequently, the processing device may be operable as a central part of a control system for controlling the output functions of the processing device and/or of external output devices responsive to control inputs received from inputs of the processing device and/or of external input devices. The processing device may provide a graphical programming environment for creating instructions executable by input and or output devices (e.g. by means of graphical and/or text-based programming), thus allowing configuration of a control system of input and output devices that may, once programmed/configured—operate with or without further involvement of the processing device. It will be appreciated that the processing device may provide various user-interface functions so as to allow a user to configure the operation of the processing device and/or the input and/or output devices.

The control input may be received by the processing device, e.g. by an internal input device of the processing device, or by an external input device. Examples of input devices include a proximity sensor for detecting the proximity of another object. Other examples of input devices may be responsive to other control inputs such as mechanical forces, push, pull, rotation, tilt, human manipulation, user input, touch, electrical signals, radio frequency signals, optical signals, visible light signals, infrared signals, magnetic signals, temperature, humidity, radiation, etc. Further examples of control inputs include user-interface elements that receive user input such as buttons, scroll wheels, touch based displays etc. The input device may be configured to provide a binary signal, e.g. indicative of whether an input has been received or not. Alternatively or additionally, the input device may be configured to generate a multi-level or even continuous signal indicative of multiple different inputs and/or indicative of a level or magnitude of activation.

An input device may thus be operable to generate and communicate, via a wired or wireless communications interface, a control signal which may be indicative of a presence/absence and/or of a property of the received control input, e.g. activation of a user interface element such as a button or joystick, a direction of a rotation or tilt, or a degree of the detected quantity, e.g. the speed of a rotation or motion, a force, a temperature, a sound pressure, a light intensity, a tilt angle, a multi-dimensional property such as speed and direction of a rotation or a light colour and intensity, etc. The device—e.g. the processing device—receiving the control signal may then, responsive to the received control signal, issue a control command as described herein. Alternatively, the input device itself may generate a control command to control a controllable function responsive to the received control input and responsive to the relative position of the corresponding user-interface elements representing the control input and the controllable function. As mentioned above, the control command may be dependent on the output device to which the control command is addressed. Similarly, if an input device is to have a functional relationship to more than one output device, the input device may, in some embodiments, output separate and different control commands for each output device.

The controllable function may be performed by the processing device, e.g. by an internal output device of the processing device, or by an external output device.

An output device may be any suitable device for performing a function, such as a function that provides a user-perceptible effect, such as a visible, tactile, mechanical or audible effect. In one example, the output device comprises a motor and a coupling member for receiving a shaft that may be rotatably driven by the motor. Other examples of output devices may include any suitable mechanical and/or electrical device, arrangement or circuitry adapted to perform one or more mechanical or electrical function. User-interface output elements of graphical user interfaces and other user interface outputs are further examples of output devices.

Examples of a mechanical function that an output device can perform include driving a rotating output shaft, winding-up a string or a chain which enables pulling an object closer to the output device, moving a hinged part of the output device which enables e.g. opening or closing a door, ejecting an object, rotating a turntable, moving a linear actuator, etc. Such mechanical motions can be driven by an electric motor powered by a battery or a rechargeable electric capacitor, or another suitable power source.

Examples of an electrical function that an output devices can perform include operating a switch with accessible terminals, emitting constant or blinking light, activating several lamps in a predetermined sequence, emitting audible sound such as beep, alarm, bell, siren, voice message, music, synthetic sound, natural or imitated sound simulating and stimulating play activities, recording and playback of a sound, emitting inaudible sound such as ultrasound, emitting a radio frequency signal or an infrared signal to be received by another component, providing visible output via a display, etc.

Further examples of output devices include user interface elements, e.g. graphical user-interface elements, of the processing device such as meters, display-based elements including numerical display, graph representations etc Hence, an example of an output device may include a light source such as a lamp or LED, a sound generator, a motor, a hinged part, a rotatable shaft, a signal generator, s linear actuator, a display, or the like. A system of electronic devices, such as a modular construction system, may comprise several of such output devices configured to, responsive to control commands, provide different functions.

Examples of input and/or output devices may include a suitably programmed or otherwise configured processing unit which may be configured by firmware, by an executable program or in another suitable manner.

Issuing the control command may comprise communicating the control command to an output device. The communication may be wired or wireless. In wired systems, the connection between devices may be permanent such that a user cannot disconnect items, or it may use a physical connector system such that devices can be added, removed or exchanged in the system by a simple physical user action. Such wired systems may comprise a centralized power source such that the wire also provides power to devices in the system in addition to data for the functional connection.

In removable wired systems the areas in which removable physical connectors can be attached to a device are commonly referred to as ports. Ports typically contain mechanical and electrical considerations such that the mechanical details provide a physical securing method for the connector, and the electrical details provide an electrical connection to the connector. Ports can be designated to be electrically compatible to input devices, output devices or devices that have both input and output functionality. Examples of wired connections include serial or parallel wired connections such as a USB connection.

In wireless systems, a functional connection is created between devices without wires. The technology for creating such a wireless connection can include using visible and non-visible light, audible and non-audible sound, and/or radio-frequency signals. Depending on the technology and implementation of the wireless connection, devices can be added, removed and exchanged in the system. A wireless connection may include any suitable communications technology including but not limited to radio-frequency communication, such as Bluetooth or a similar short-range communication technology, e.g. having a communications range of less than 100 m, e.g. less than 20 m. In most situations a communications range of less than 10 m and, in most cases even less than 5 m is sufficient, even though in some embodiments longer ranges may be acceptable or even desirable. The communications range of the wireless communication may be at least 0.5 m, e.g. at least 1 m. In some embodiments, the wireless connection uses a Bluetooth standard, such as a Bluetooth Low Energy standard. In some embodiments, the processing device and/or some or each of the input and/or devices may include a transceiver so as to allow two-way communication between them and/or with the processing device.

In systems comprising multiple electronic devices that have the ability for devices to be added, removed and exchanged, the, electronic devices may be operable to identify themselves to the broader system, thus enabling the system to adapt to best use the functional information from the device or give functional information that is compatible to the device. Generally, in some embodiments, the method comprises detecting one or more input and/or output devices that are wire-connected or wirelessly connected to the processing device; and selectively presenting user-selectable user-interface elements representative only of detected input and/or output devices.

In some embodiments, a system of wire-connected and/or wirelessly connectable electronic devices comprises a processing device, one or more input devices and/or one or more output devices; each output device being operable to receive a control command from at least one other electronic device and to control one or more controllable functions responsive to the received control command; each input device may include or be connectable to one or more sensors or other inputs operable to detect a sensor input. The input device may be operable to transmit, responsive to the detected sensor input, a control command to one or more electronic devices that are wire-connected or wirelessly connected to the input device. Alternatively or additionally, the input device may be operable to communicate the sensor input to the processing device which, in turn is configured to transmit a control command to one or more external output devices or to an internal output device. Each output device may comprise or be connectable to an output adapted to perform a controllable function responsive to a control command received from an input device or from the processing device.

In some embodiments, an electronic device may comprise one or more connectors, e.g. a plug or a socket, for establishing one or more wired connections to one or more additional electronic devices, alternative to or in addition to the wireless connection described above. The wire-connected additional electronic device can thus use signals and/or data received by the wirelessly or wire-connected device. Alternatively or additionally, a wire-connected additional electronic device may provide signals or data to the wirelessly or wire-connectable electronic device. Hence, the additional electronic device may be operable as an external sensor input and/or as an external function. The wirelessly or wire-connectable device may even have the primary function of providing an interface between different wireless and wired communications networks.

Each of the electronic devices may be a physically separate electronic device, e.g. having its own housing, and which may be positioned by the user relative to one of the other electronic devices of a system, e.g. the processing device, it will be understood that, in some embodiments, two or more electronic devices may be mechanically and/or electrically connectable with each other; in some embodiments they may be removably connectable with each other while, in some embodiments, they may be permanently connected with each other while still providing individual functions. Each electronic device may include its own energy source, such as its own battery; alternatively or additionally, one or more electronic device may be connectable to an external energy source.

It will be appreciated that, in some embodiments, some or all electronic devices of a system of electronic devices may be operable as both an input device and an output device. In some embodiments, each output device may be connectable to one or more input devices at a time.

In some embodiments, the input and output devices are interactive construction elements of a modular construction system, e.g. an educational or toy construction system or an industrial modular system. In some embodiments, each interactive construction element comprises coupling members configured for releasably interconnecting the interactive construction elements with each other.

The present invention relates to different aspects including the method and system described above and in the following as well as further methods, apparatus, products and system. Each aspect may have one or more advantages described in connection with one of the other aspects and each aspect may have one or more embodiments as described in connection with one of the other aspects and/or as defined in one or more of the appended claims.

In particular, according to another aspect, disclosed herein are embodiments of a processing device comprising a processing unit configured to perform the steps of the method described herein. Here and in the following, the term processing unit is intended to comprise any circuit and/or device suitably adapted to perform the functions described herein. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the processing device may comprise a memory or other computer-readable medium having stored thereon a computer program which, when executed by the processing unit causes the processing unit to perform the steps of the method described herein. The processing device may further comprise a wired or wireless communications interface.

In some embodiments, a modular construction system comprises construction elements—e.g. the input and output devices described herein and/or conventional construction elements comprising coupling members for releasably interconnecting toy construction elements. The modular construction system may be an educational or a toy construction system and the construction elements may be toy construction elements. Alternatively the modular construction system may be an industrial system. The construction elements may have a top surface, a bottom surface, and coupling members placed on at least one of the top and the bottom surface; wherein the construction elements have a uniform height defined between the top and bottom surfaces. The coupling members may utilise any suitable mechanism for releasably connecting construction elements with other construction elements. In some embodiments, the coupling members comprise one or more protrusions and one or more cavities, each cavity being adapted to receive at least one of the protrusions in a frictional engagement.

Embodiments of the method and system described herein allow a user to construct a large variety of functions and functional relationships in a uniform and well-structured manner. For example, a modular construction system may be provided as a construction set comprising a number of input devices having different sensors for receiving different control inputs, and a number of output devices implementing respective functions. Optionally, such a construction set may comprise one or more of the following: a number of input and output devices, conventional construction elements, an instruction manual, and/or the like.

According to one aspect, disclosed herein are embodiments of a computer program product comprising program code means adapted to cause, when executed on a processing device, to perform the steps of the method described herein. The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network. In some embodiments, the product may be dedicated for this purpose/use and therefore have this program integrated in delivered form.

BRIEF DESCRIPTION OF THE DRAWINGS

Various aspects and embodiments of electronic devices disclosed herein will now be described with reference to the drawings.

FIGS. 11-12 show a number of alternative user-interface elements, illustrating different ways that an input device and an output device may be represented in.

FIGS. 27A-C show examples of toy construction elements.

DETAILED DESCRIPTION

Figure 1:
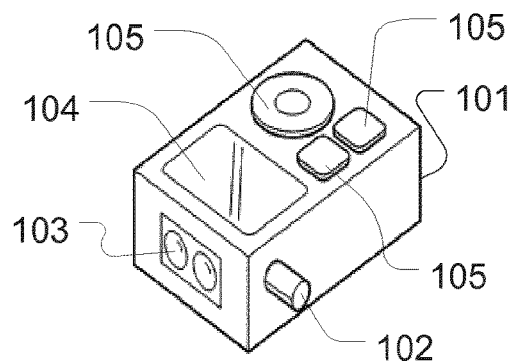
FIG. 1 shows an example of an electronic device that integrates inputs and outputs.

FIG. 1 shows an example of an electronic device that integrates different inputs and outputs. In particular, the electronic device 101 comprises a distance sensor 103 and a motor (not explicitly shown) for rotating an output shaft 102. The electronic device further comprises a display 104 and further user input devices 105 allowing a user to provide inputs to the device.

The display 104 may be a simple display, a display for providing a graphical user interface, a touch screen or another suitable display.

Consequently, the device of FIG. 1 may be used as processing device which provides a graphical user interface on display 104 for allowing a user to position graphical user-interface elements. The device 101 may also be used as an input device where the distance sensor 103 and/or the user input devices 105 may be used as control inputs. If the display 104 is a touch sensitive display, the display may also be used to receive control inputs. Moreover, the device 101 may be used as an output device where the display 104 and/or the motor are operable to perform controllable functions.

It will be appreciated that other electronic devices may have more, fewer and/or different input and/or output elements. For example, some electronic devices may merely be operable as output devices, while others may merely be operable as input devices.

Figure 2:
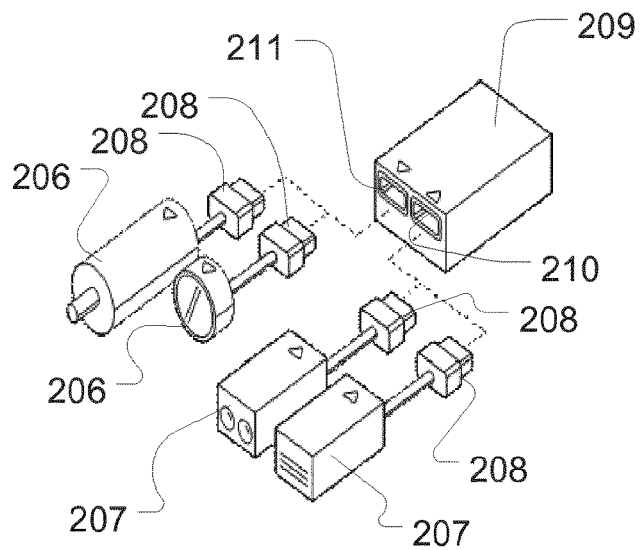
FIGS. 2-3 show examples of a system comprising multiple electronic devices.

FIG. 2 shows an example of a system comprising multiple electronic devices. The system uses wired connections to connect separate input and output devices via removable connections. In particular, the system of FIG. 2 comprises two dedicated output devices 206, in this example a motor and a loudspeaker, and two dedicated input devices 207, in this example a distance sensor and a microphone; it will be appreciated, however, that a system may include any number and types of input devices and any number and types of output devices. In the example of FIG. 2, each of the input and output devices include a wired interface including a connector 208. The system further comprises a central device 209 which comprises an input port 210 for removably receiving a connector of one of the input devices 207, and an output port 211 for removably receiving a connector of one of the output devices 206. Hence, central device 209 may receive control signals via its input port 210 from one of the input devices 207, the control signals may be indicative of the detected input—e.g. a detected distance or recorded sound—by the connected input device. The central device 209 may further send, via its output port 211 control commands to a connected output device for controlling a controllable function of the connected output device, e.g. operation of the motor or a loudspeaker. It will be appreciated that the central device 209 may include more than one output port and/or more than one input port.

The central device 209 may be a processing device including a display for providing a graphical user interface or it may be an interface element or hub device for exchanging signals and commands between the input and output devices and a processing device which may be wirelessly or wire-connected to the hub device 209.

Figure 3:
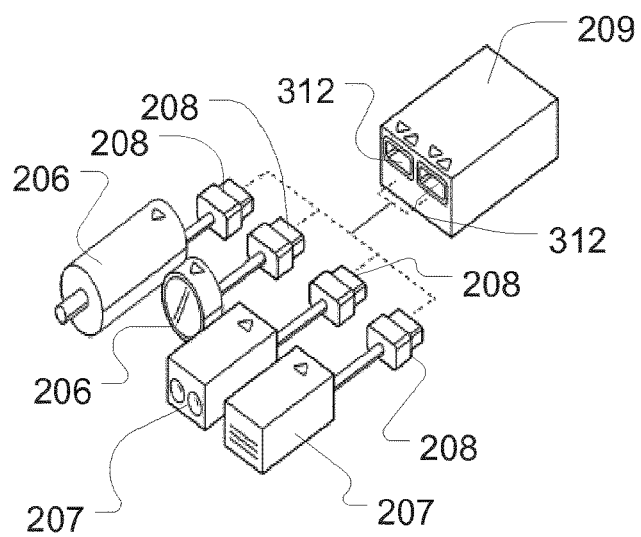

FIG. 3 shows another example of a system comprising multiple electronic devices. The system of FIG. 3 is similar to the system of FIG. 2 in that it comprises wire-connectable input devices 207 and output devices 206 and a central device 209, all as described in connection with FIG. 2 except that the central device 209 of FIG. 3 comprises two bidirectional ports 312 that may each removably receive a connector 208 of an input device or of an output device. Hence, while the ports of the central device of FIG. 2 each have a dedicated input or output functionality, the ports of the central device of FIG. 3 can have both input and output functionality.

Figure 4:
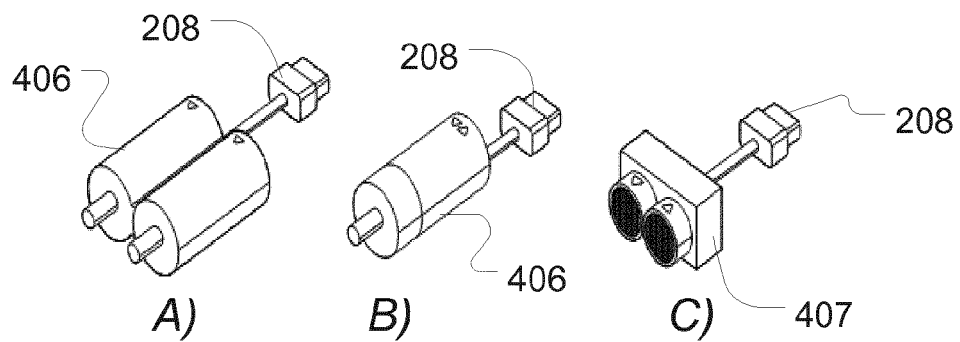
FIGS. 4A-C and 5A-C illustrate further examples of electronic devices that each includes a plurality of input and/or output functionality but which are connectable via a single wired connector.

FIGS. 4A-C illustrate further examples of electronic devices that each include a plurality of input and/or output functionality but which are connectable via a single wired connector 208. In particular, FIG. 4A shows an example of an output device 406 operable to provide two output functionalities, in the example of FIG. 4A two motors which may be controlled together and/or individually.

FIG. 4B shows an example of an output device that also includes input functionality, in this example a motor 406 with position feedback, e.g. an encoder. Such an electronic device may be considered as an output device with feedback or as a mixed input/output device.

FIG. 4C shows an example of an Input device that also includes output functionality, in the example of FIG. 4C an ultrasonic distance sensor 407 with a settable rate of taking distance samples. Such an electronic device may be considered as a controllable input device or as a mixed input/output device.

It will be appreciated that the functionality of such electronic devices that each include a plurality of input and/or output functionality can be accessed by a central device either as individual input and output functions, or as a combination thereof. To this end, they may be attached to an input, output or bi-directional port as mentioned in connection with FIG. 3.

Figure 5:
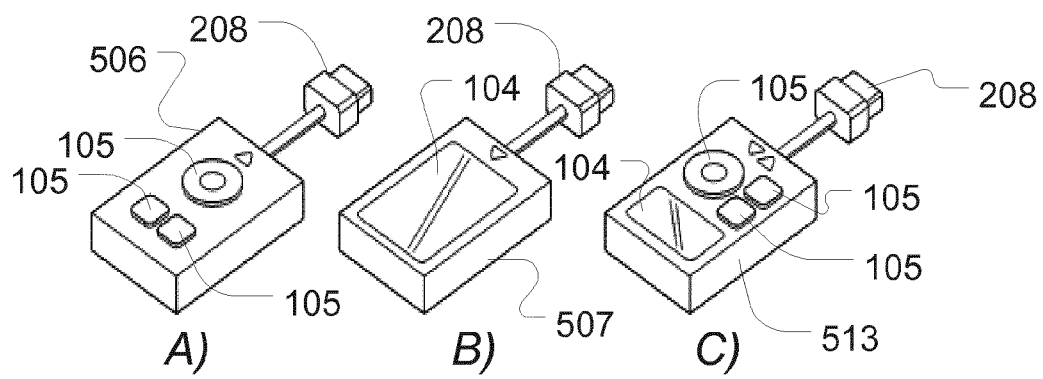

FIGS. 5A-C illustrate further examples of electronic devices that each include a plurality of input and/or output functionality but which are connectable via a single wired connector 208. In the examples of FIGS. 5A-C, the inputs and outputs are user interface inputs and outputs, respectively.

In particular, FIG. 5A illustrates an example of an input device 506 with a number of user interface input controls 105. FIG. 5B illustrates an example of an output device 507 comprising a display 104 or other output controls operable to perform a controllable output function. FIG. 5C illustrates a mixed input/output device 513 comprising a display 104 as well as a number of user interface input controls 105.

It will be appreciated that alternative embodiments of the electronic devices of FIGS. 1-3, 4A-C and 5A-C may comprise a wireless communications interface instead of the wired connectors 208. Moreover, other embodiments of electronic devices may include alternative or additional forms of inputs and/or outputs.

Figure 6:
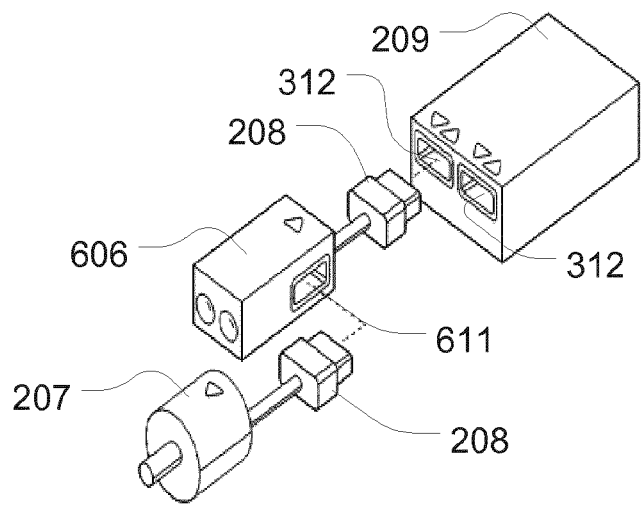
FIG. 6 illustrates a system comprising an input device, an output device and a central device.

Input and output devices may also include a port such that multiple electronic devices can be chained together. The intermediate devices may have no functional impact on other devices in the chain such that the processing device sees each device as if it were connected directly. Alternatively, the chain of devices may functionally influence each other; for example the values of two sensors may be combined/added together and/or the like. Similarly, the order of devices in the chain may influence their functional impact on each other, e.g. devices that are located within the chain further away from the processing device may influence those nearest the processing device. This is illustrated by the example of FIG. 6 which illustrates a system comprising an input device 606, an output device 207 and a central device 209, e.g. a processing device or an interface device/hub as described in connection with FIGS. 2 and 3.

The input device 606 is connectable via its connector 208 to a port 312 of the central device 209. The input device also comprises a port 611 to which a connector 208 of an output device 207 can be connected. It will be appreciated that alternative embodiments may include chains of input devices, chains of output devices and/or mixed chains comprising input and output devices and/or mixed devices. The devices in a chain may or may not have an influence upon the function of other devices.

It will be appreciated that embodiments of the system described herein allow for many network configurations. Examples of possible configurations include but are not limited to:
  devices that combine multiple ports to a single connection with a processing device; these devices may further include additional inputs, outputs and/or user interfaces;
  devices that connect distributed processing roles; e.g. by adding a device that provides the system with additional processing power/memory etc. In some embodiments a system may allow a user to connect two central processing devices, e.g. to increase the total number of available ports and/or to allow the devices to share the processing tasks.
  separate devices that add power and/or further communication means to the system.

Figure 7:
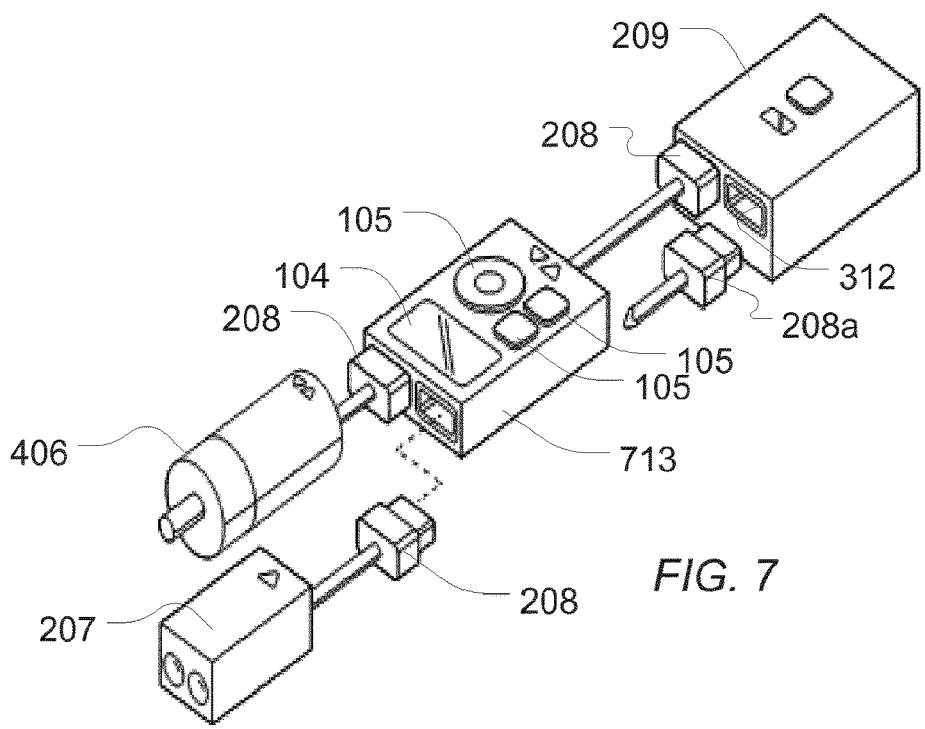
FIGS. 7-9 show examples of network configurations of electronic devices.

FIG. 7 shows one example of a network configuration comprising an input device 207 and an output device 406 that are connectable to respective ports of a mixed input/output device 713. The mixed input/output device 713 comprises a display 104 and user input elements 105. The input/output device 713, in turn, is connected via its connector 208 to one of the ports 312 of a central interface/hub device 209. Further devices may be connected to the network, as schematically indicated by additional connector 208a in FIG. 7. In this and other examples, the mixed input/output device 713 may perform processes on the attached and integrated functions in addition to those supplied by the central interface/hub device 209 and/or by a central processing device (not shown) to which the central interface/hub device may be connected.

As mentioned above, the connections between input devices and output devices and the connections between a processing device and input and/or output devices may be wired or wireless. In some embodiments, a system may comprise both wired and wireless connections for connection of inputs, outputs, distributed processing and/or communication/interface/hub devices. An example of a system using both wired and wireless connections is shown in FIG. 8.

Figure 8:
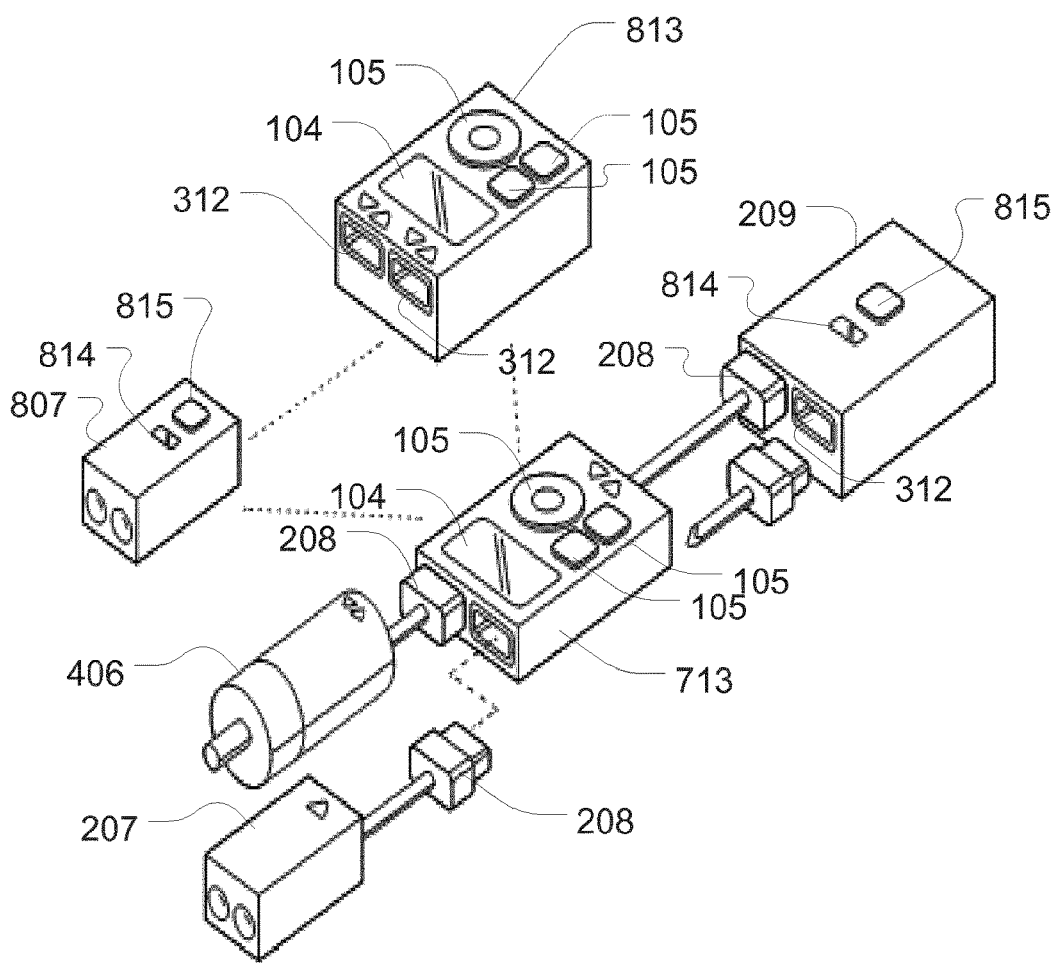

In particular, FIG. 8 shows an example of a network configuration comprising an input device 207 and an output device 406 that are connected to respective ports of a mixed input/output device 713 which comprises a display 104 and user input elements 105. The input/output device 713, in turn, is connected via its connector 208 to one of the ports 312 of a central interface/hub device 209. The system of FIG. 8 further comprises a wirelessly connectable input device 807 and a mixed input/output device 813 that is both wirelessly and wire-connectable. To this end, the mixed device 813 comprises ports 312 for receiving connectors of wire-connectable devices and a wireless communications interface, e.g. a transceiver (not shown), for establishing wireless connections with other electronic devices. The mixed device further comprises a display 104 and further user input elements 105.

The input device 807 is also a wirelessly connectable device and comprises a wireless communications interface, e.g. a transceiver (not shown), for establishing wireless connections with other electronic devices. Input device 807 further comprises a button 815 or other user-activatable input that allows a user to configure a network of electronic devices and/or to bring the input device 807 in different operational modes, e.g. a connected mode, and unconnected mode, an inactive mode and/or an activated mode. The input device 807 further comprises a connectivity indicator 814, such as a multi-coloured light source, that is operable to provide visible feedback to the user about the operational mode and/or the connection state of the input device. It will be appreciated that the user interface may comprise additional user-interface elements, e.g. for controlling other functions of the electronic device. Hence the user may use button 815 of input device 807 and the user input elements 105 of device 813 to establish a wireless connection between devices 813 and 807 and/or with other electronic devices. In the example of FIG. 8, electronic devices 807 and 813 are also wirelessly connected to the mixed input/output device 713 so as to form a wireless network including devices 807, 813 and 713, as indicated by dotted lines in FIG. 8. To this end, electronic device 713 also comprises a wireless communications interface, e.g. a transceiver (not shown), for establishing wireless connections with other electronic devices. The display and/or user input elements 105 may be operable to facilitate a user-controlled establishment of wireless connections with other electronic devices.

Finally, in the example of FIG. 8, hub device 209 also comprises a wireless communications interface, e.g. a transceiver (not shown), for establishing wireless connections with other electronic devices, a button 815 and connectivity indicator 814 as described in connection with device 807. Accordingly, hub device 209 is also wirelessly connectable to other electronic devices (e.g. a processing device having a display) even though, in the example of the network configuration of FIG. 8, device 209 is not currently wirelessly connected but has only a wired connection to device 713. It will be appreciated, however, that a number of alternative network configurations may be provided, including but not limited to: configurations that only include wireless connections, configurations that only include wired connections, configurations that include both wired and wireless connections.

Figure 9:
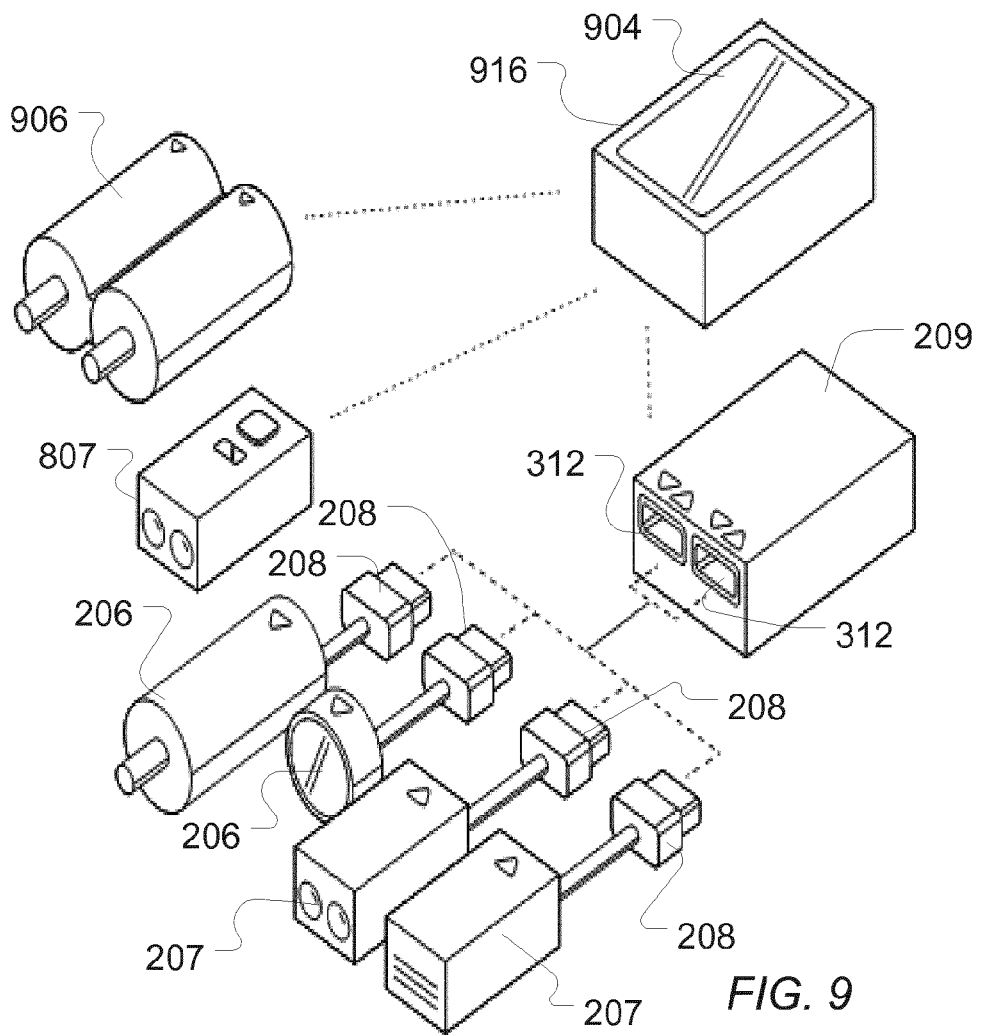

FIG. 9 shows another example of a mixed system including wired and wireless connections. The system of FIG. 9 comprises a processing device 916, e.g. a tablet computer or other handheld or stationary computing device, comprising a display 904, e.g. a touch screen, for providing a graphical user interface. The processing device 916 is wirelessly connected to an output device 906, an input device 807 and an interface/hub device 209. The hub device 209 comprises ports 312 for providing wired connections with wired output devices 206 and wired input devices 207 via their respective connectors 208. Hence, the hub device 209 provides a communications interface between the wirelessly connected processing device 916 and each of the wire-connected devices 206 and 207. The hub device 209 may further provide a communications interface among the wire-connected devices, e.g. between an input device 207 and an output devices 206 so as to allow an input device 207 to issue a control command to one of the output devices 206. While the processing device 916 of the example of FIG. 9 has no direct wired connection, it will be appreciated that alternative embodiments of processing devices may include a wired communications interface, e.g. a port, in addition to or instead of a wireless communications interface.

Electronic devices that are present in a wired, a wireless or a mixed wired/wireless system may include an identification such that their presence in the system can be recognized by other electronic devices, e.g. the processing device and/or by other input and/or output devices. Accordingly, when a processing device or another electronic device having a display has detected the presence of another electronic device, a user-interface element representing the detected device may be displayed on the display. The detection of the presence may comprise detection of a wire-connected device, the detection of a wirelessly connectable device within a communications range and/or the detection of a wirelessly connectable device once a wireless connection has been established. This may include devices that do not themselves have input/output functionality yet provide an interface or process to the system. The devices represented on the display may (or may not) be organized such that it is apparent how they are connected (ie: via a hub device), as illustrated by the example of FIG. 10.

Figure 10:
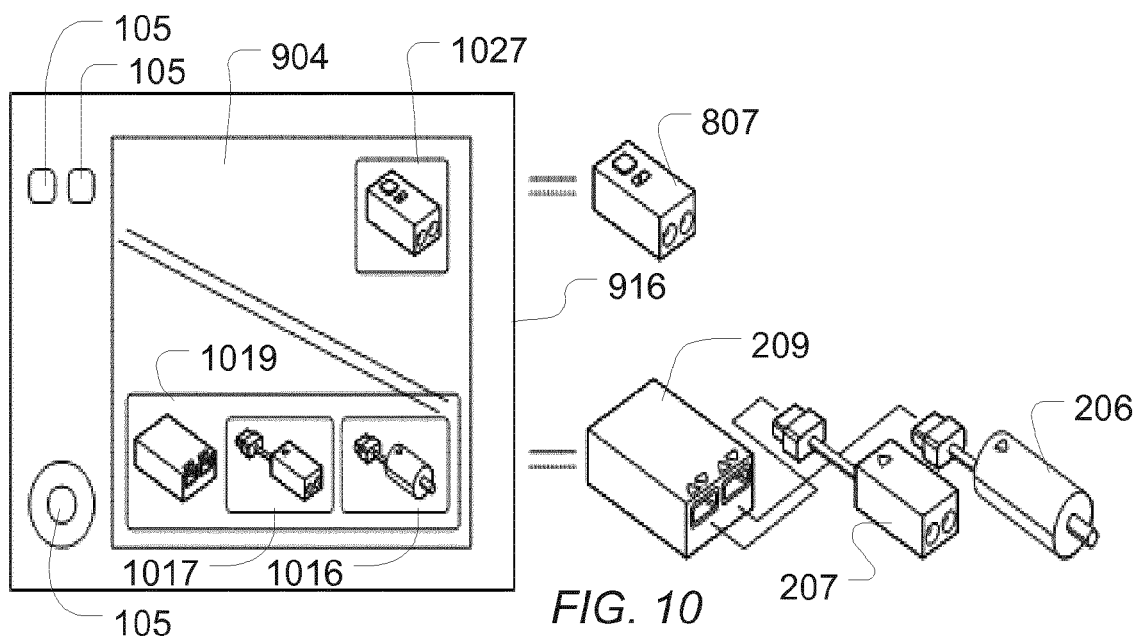
FIG. 10 shows an example of a system of electronic devices and illustrates an example of how the input devices and output devices present in the system may be identified and displayed. The display of the input devices and output devices may be arranged so as to represent their connection relationship.

In particular, FIG. 10 illustrates a system similar to the system of FIG. 9, comprising a processing device 916, e.g. a tablet computer or other handheld or stationary computing device, comprising a display 904, e.g. a touch screen, for providing a graphical user interface. The processing device of FIG. 10 further comprises additional input elements 105 such as buttons or the like. The processing device 916 is wirelessly connected to an input device 807 and to an interface/hub device 209. The hub device 209 is wire-connected with a wired output device 206 and wired input device 207, all as described in connection with FIG. 9. As the processing device 916 has detected the presence of the wireless input device 807 and the hub device 290, including the presence of the wired devices 206 and 207 connected to the hub device, the processing device 916 displays a user-interface element 1027 representing the wireless input device 807, a user-interface element 1019 representing the hub device 209, a user-interface element 1017 representing the wired input device 207 and a user-interface element 1016 representing the wired output device 206. It will be appreciated that the graphical user-interface elements may have a variety of shapes, sizes and appearance. For example they may be represented as icons as in the example of FIG. 10. In the example of FIG. 10, the user-interface elements 1017 and 1016 are shown within the area of the user-interface element 1019 so as to indicate that the devices 206 and 207 are connected via the hub device 209. However, it will be appreciated that such an indication may be provided in a number of different ways or be omitted.

Figure 11:
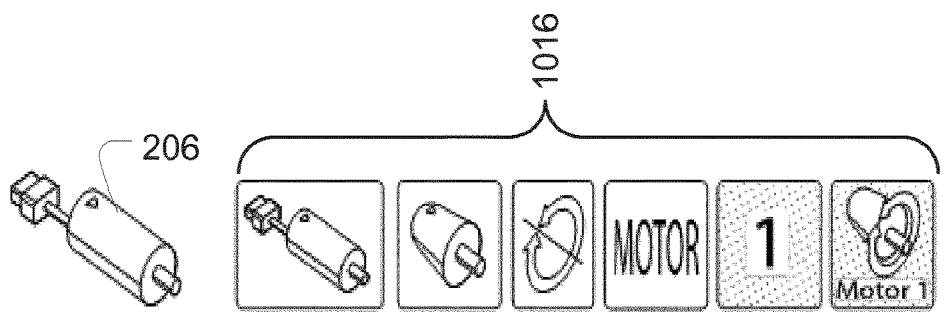

Electronic devices such as input devices, output devices or mixed devices may be graphically represented in many different ways, as is illustrated in FIG. 11 for an example of an output device 206, in this example a motor. In particular, FIG. 11 shows a number of alternative user-interface elements 1016 that may be used to represent the motor 206. Generally, examples of graphical representations of an electronic device include but are not limited to: an actual representation of physical device (e.g. illustration or photo quality), a stylized representation that may omit physical details of device, an illustration/representation of actual function of device (e.g.: turning motion representing a motor), a text based name of device, a color or a number ID of the device, a mix of 2 or more of these representations, etc.

Figure 12:
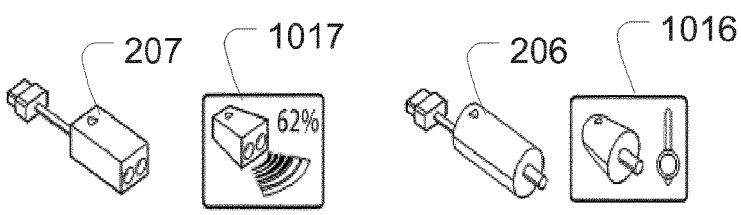

In addition to being selectable and movable in a display environment, the graphical user-interface elements may be passive elements or active elements which may be operable to receive user input or provide a varying output, such as a control interface for an output and/or an indication of current output state. The user input may be in the form of an activation or another form of user-manipulation of the graphical user-interface element. For example, user-interface element representing a connected device may include a representation of the current functional state of the connected device, e.g. a representation of a current sensor input of an input device, FIG. 12 illustrates examples of active user-interface elements representing and/or allowing user-control of a current functional state of a detected electronic device. In particular, FIG. 12 shows an example of an input device 207, e.g. a distance sensor where the corresponding user-interface element 1017 displays a representation of the current sensor input. Such a representation may be texturally, through graphical means, or in another suitable way.

Similarly, a representation may include a user-interface control element providing functionality of the device that can be user-controlled controlled by a user activating the control element. In particular, FIG. 12 shows an example of an output device 206, e.g. a motor, where the corresponding user-interface element 1016 includes a user-manipulatable speed-control graphic element for controlling the speed of the represented motor 206. It will be appreciated that the user-interface control element may have a variety of forms and shapes, such as buttons, sliders, knobs, etc. The user-interface control element may be controlled directly via a touch based screen or with an additional user input of the processing device, e.g. user inputs 105 of the processing device of FIG. 10. FIG. 12 illustrates that a user interface element (1017) may include a representation of the current status of an output and/or an additional user interface such that a control setting may be made on the user interface element (1016).

Figure 13:
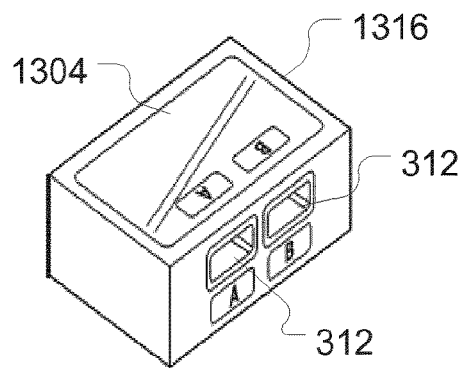
FIG. 13 illustrates an example of an electronic device operable to provide a location relationship between a physical port and a screen representation.

Electronic devices may have labels or design details associated with physical connection points such as ports. Representations of these labels may also be used in a display and provide a graphic association to devices that are represented. The representations of such labels may also be arranged on a display screen such that their relative position has a relationship to the relative position of the actual connection points. FIG. 13 illustrates an example of an electronic device 1316, e.g. a processing device. The device comprises a display 1304 and connection ports 312 for receiving connectors a wire-connectable electronic devices. In this example, both the ports are labelled and the display shows corresponding labels at positions adjacent to the physical position of the corresponding port.

Figure 14:
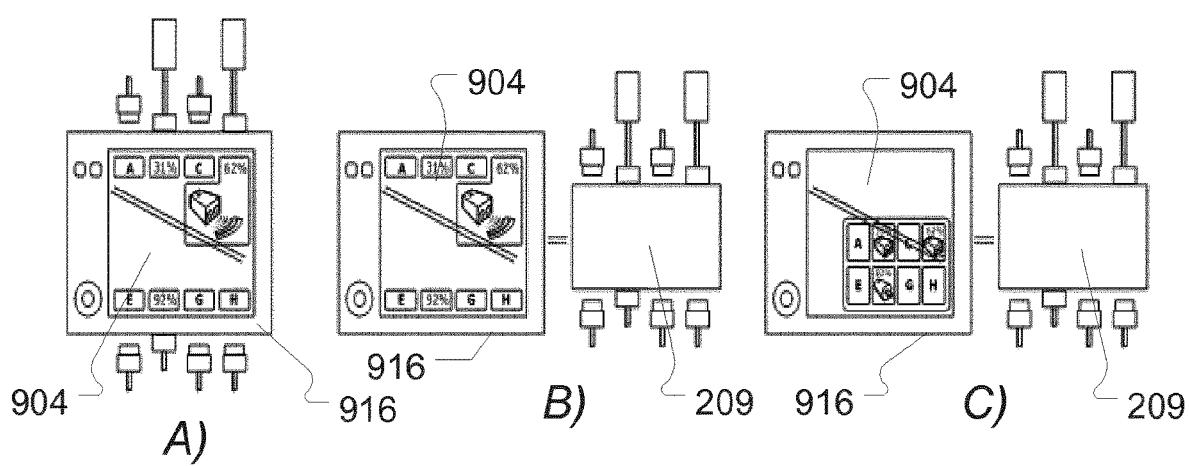
FIGS. 14A-C show examples of a processing device comprising a display, illustrating further examples of a location relationship between screen representation and physical ports.

Representations of the connected devices may be positioned within the display such that their position reflects their actual physical connection location, as illustrated in FIGS. 14A-C.

FIG. 14A shows a processing device 916 comprising a display 904 and having connection ports along the periphery of the display. In the example of FIG. 14A representations of connected devices are shown within the display area and along the periphery of the display area adjacent to the connection ports where the corresponding device is connected.

FIG. 14B shows a processing device 916 wirelessly connected to a hub device 209 to which a number of wire-connected devices are connected. As illustrated by FIG. 14B, the spatial relationship between actual connection points and representations in a display may still exist even when the device showing the representation is wire-connected or wirelessly connected to another device that includes the actual connection points.

The representations of connected devices may be placed along the periphery of the display or along a periphery of an area within the display, as illustrated in FIG. 14C showing a similar system as FIG. 14B but with a different graphical representation of connected devices. In FIG. 14C, the graphical representations are only positioned within a portion of the display area. For example, the representation may be limited to representing the spatial relationship of the connection points and not necessarily include correct scaling and/or exclude the width of connection device, etc.

Figure 15:
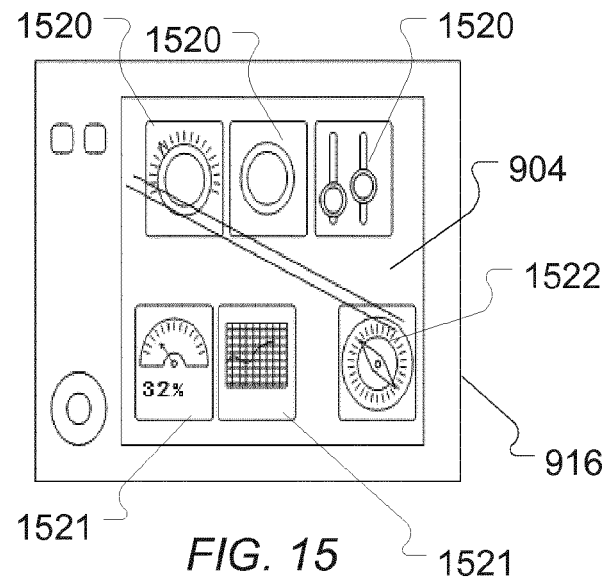
FIG. 15 shows an example of a processing device having a display for providing a graphical user interface.

Functionality of a processing device with a display may also contribute functionality to the overall system, e.g. input and/or output functionality; this functionality may be represented in the display similar to functionality of external input and/or output devices. The functionality of the processing device may include functionality related to the display itself. FIG. 15 shows an example of a processing device 916 having a display 904 for providing a graphical user interface. The processing device 916 shows graphical representations of various functions which may include one or more of the following:

a representation of screen-based user interface controls 1520 which could be touch screen or additional UI controllable;

representations 1521 of values in various formats including text/graphic representations of live data etc;

representation of a hidden function within the device such as compass 1522; the representation may include a representation of the current state or value of such a function.

Control inputs (in the following also simply referred to as "inputs") and controllable functions (in the following also simply referred to as "outputs"), including internal inputs/outputs, external inputs/outputs (of wire-connected or wirelessly connected external devices) may be arranged in a display such that "input" devices/functionality and "output" devices/functionality are grouped in respective groups. This may be in list format with the list being ordered in different ways, e.g. showing internal devices on top of the list or by an alternative hierarchical scheme related to input or output type. Similarly, user interface inputs and outputs may be grouped accordingly, e.g. together with physical inputs and outputs, respectively.

Figure 16:
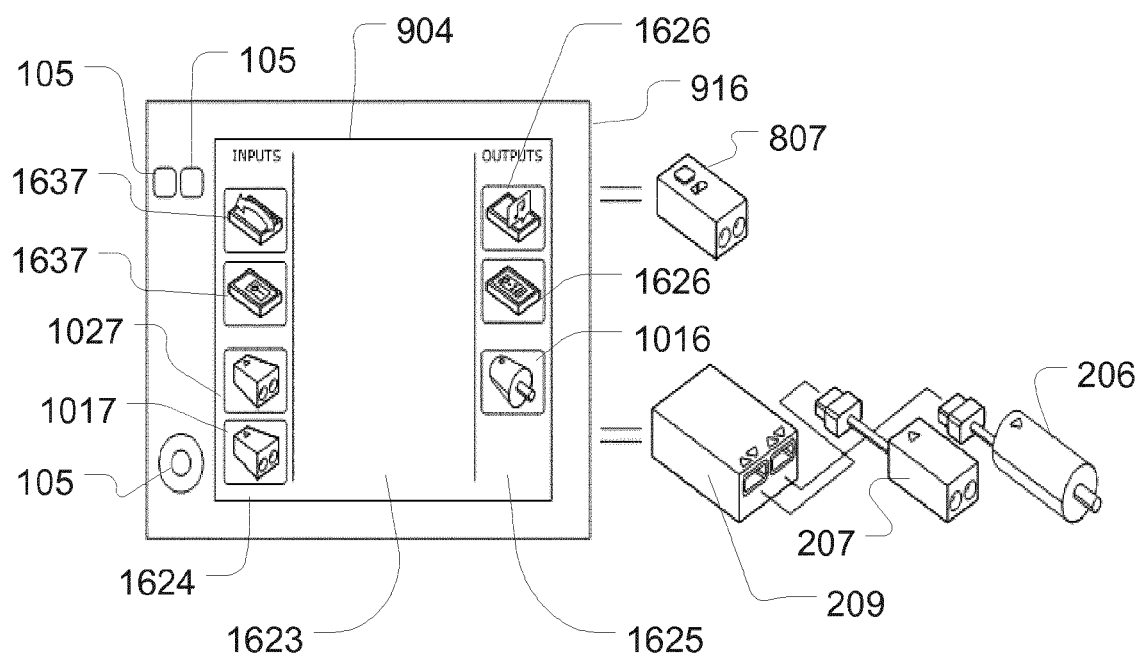
FIG. 16 shows an example of a system of electronic devices including a processing device having a graphical user interface where internal and external input devices and output devices are displayed on the display such that the input devices and output devices are grouped together in respective groups.

FIG. 16 illustrates an example of such a grouping. In particular, FIG. 16 illustrates a system similar to the one of FIG. 10 in that the system comprises a processing device 916, e.g. a tablet computer or other handheld or stationary computing device, comprising a display 904, e.g. a touch screen, for providing a graphical user interface. The processing device of FIG. 16 further comprises additional input elements 105 such as buttons or the like. The processing device 916 is wirelessly connected to an input device 807 and to an interface/hub device 209. The hub device 209 is wire-connected with a wired output device 206 and wired input device 207, all as described in connection with FIGS. 9 and 10. As the processing device 916 has detected the presence of the wireless input device 807 and the hub device 290, including the presence of the wired devices 206 and 207 connected to the hub device, the processing device displays a user-interface element 1027 representing the wireless input device 807, a user-interface element 1017 representing the wired input device 207 and a user-interface element 1016 representing the wired output device 206, all as described in connection with FIG. 10. Only displaying what input and output devices/functions that are available has been found to improve the user experience by not offering functionality that is not currently relevant.

The processing device 916 of FIG. 16 further displays user-interface elements 1637 representing internal input functions of the processing device 916, such as an internal tilt sensor, the user input elements 105, and/or graphical user interface controls that can be placed within the graphical user interface. The processing device 916 further displays user-interface elements 1626 representing internal output functions of the processing device 916, such as a sound generator of the processing device or graphical user-interface output elements that can be placed within the graphical user interface.

The user-interface elements are grouped in a first group comprising the elements that represent "inputs" and a second group 1625 comprising the elements that represent "outputs". The graphical user interface further comprises a display area 1623 allowing a user to place selected user elements as will be described in greater detail below. It will be appreciated that the groups of input and output elements may be arranged in a different manner, e.g. on top and/or in the bottom of the display area 1623; they may be permanently visible or they may be selectively shown in an expanded or retracted state, e.g. expanded only upon a user-selection of the corresponding group.

The user-interface elements representing inputs and outputs may be selected by a user and positioned in the display area 1623, e.g. via a touch screen interface or via additional Interface elements. Changing the position of a user-interface element may influence its representation; for example its size and/or color may alter. Similarly, additional graphical details may be added including graphic elements that have a live user interface function, e.g. as illustrated in FIG. 17.

Figure 17:
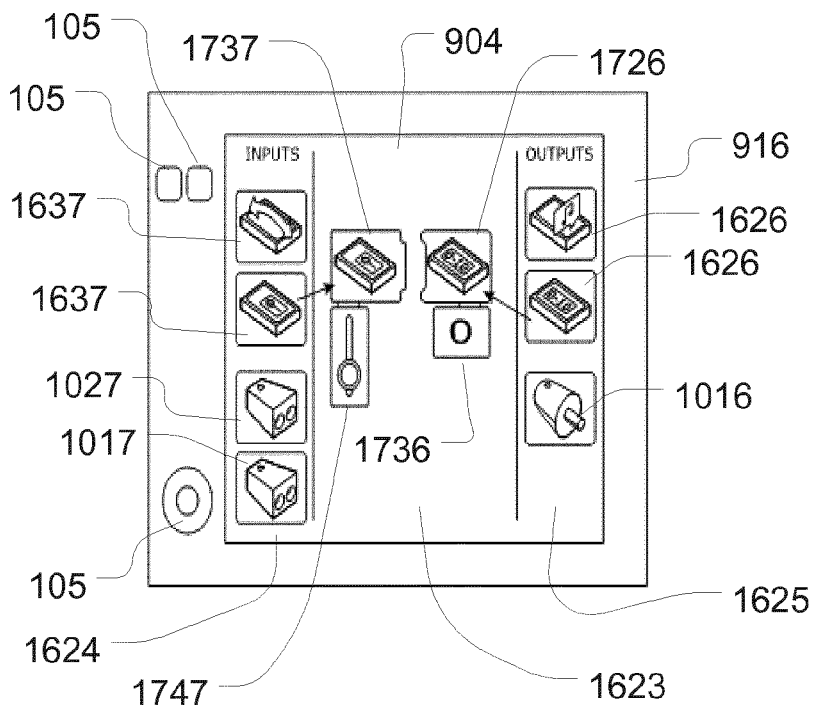
FIGS. 17-18 show an example of the processing device of FIG. 16.

FIG. 17 shows the processing device of FIG. 16 but where one of the representations 1637 has been selected by a user interaction and positioned as user-interface element 1737 within the display area 1623. As a user may be allowed to place multiple instances of user-interface elements that represent the same input or output within the display area 1623, the corresponding element 1637 in the list of selectable elements has not been removed. However, some embodiments may impose restrictions on the number of instances of the same user-interface element that may be selected. As illustrated in FIG. 17, the shape of the user-interface element 1737 is different from the corresponding element 1637 in the list 1624 of selectable user-interface elements representing inputs. Additionally, the user-interface element 1737 has an associated user interface control 1747. Similarly, one of the user-interface elements 1626 representing outputs has been selected and positioned as user-interface element 1726 within the display area 1623. As illustrated in FIG. 17, the shape of the user-interface element 1726 is different from the corresponding representation 1626 in the list 1624 of selectable output user-interface elements. Additionally, the user-interface element 1726 has an associated user interface output 1736. It will be appreciated, however, that in alternative embodiments, the user-interface elements in the display area may have the same appearance as the corresponding representation in the corresponding list.

In the example of FIG. 17, positioning selected user-interface elements within a display area may modify the overall shape of the user-interface element such that elements representing inputs acquire a protrusion and elements representing outputs a recess; the protrusion and recess are related such that the protrusion of an input element graphically fits to a recess in an output element. The behavior of re-positioning user-interface elements may include the effect that an input element and an output element jump to a connected state where protrusion and recess are combined if the two user-interface elements are within a predetermined distance to each other within the display area. It will be appreciated that connections between inputs and outputs may graphically be represented in a different manner, e.g. by different interconnecting shapes, by connector elements, such as lines or arrows, etc. Alternatively, the connection may not be visually indicated as such, but the establishment of the connection may e.g. be represented by the elements jumping to an aligned position.

Figure 18:
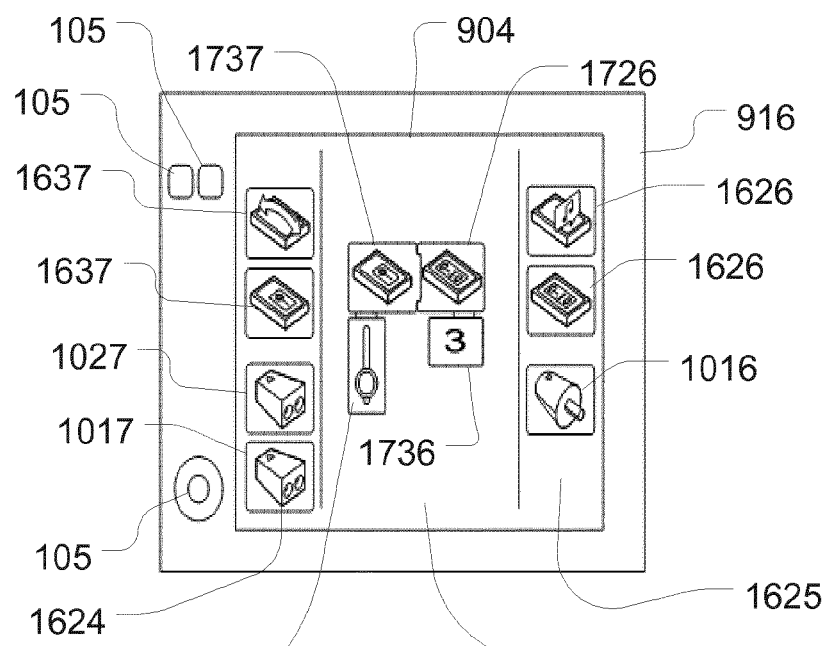

FIG. 18 shows the processing device of FIG. 17 where the user-interface elements 1737 and 1726 are positioned in a connected state. When an input and output user-interface element are connected in such a way, an actual functional relationship is set for the devices/functionality which the user-interface elements represent. For example a user-activation of the control element 1747 will cause the processing device 916 to issue a corresponding control command to the output device or output function represented by user-interface element 1726.

Figure 19:
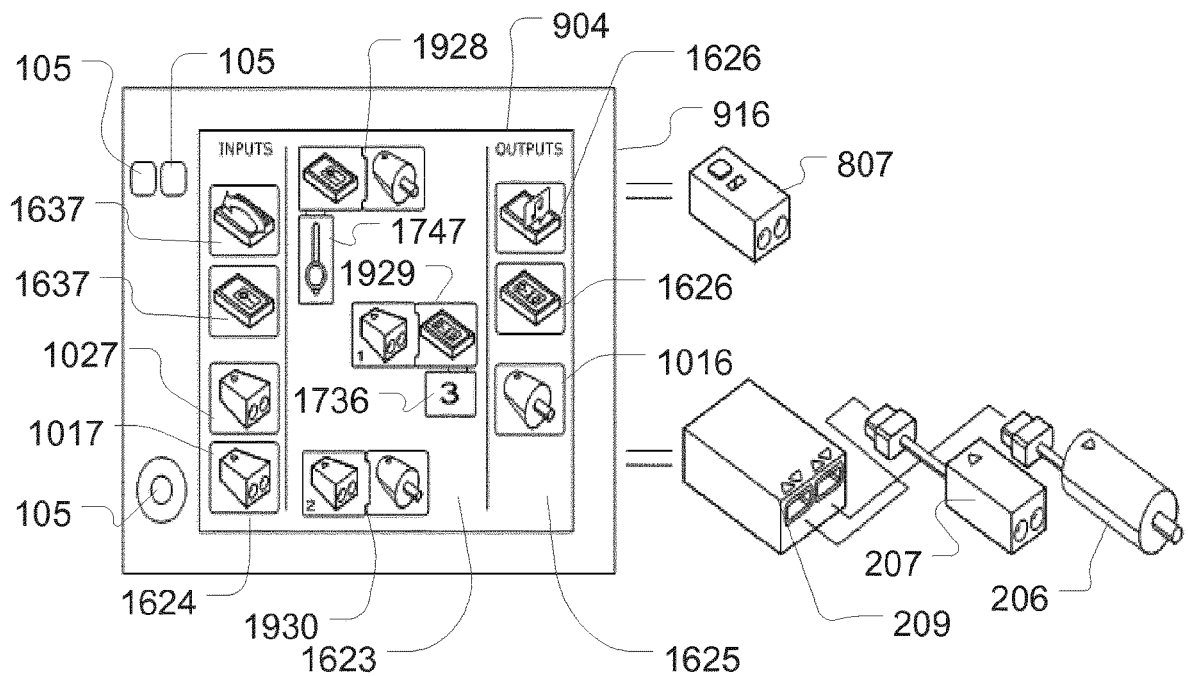
FIG. 19 shows the system of FIG. 16 in a different operational state.

FIG. 19 illustrates the system of FIG. 16 where a number of user-interface elements have been positioned within the display area 1623 and interconnected with one another so as to establish a number of functional relationships between the corresponding inputs and outputs.

The input/output functional relationships established by the graphic connection of user-interface elements in the example of FIG. 19 include:

user-interface elements 1928 arranged within the display area 1623 so as to cause the processing device to establish a functional relationship between a user interface slider 1747 and an external motor 206;

user-interface elements 1929 arranged within the display area 1623 so as to cause the processing device to establish a functional relationship between distance sensing device 207 and a display element 1736 displaying a sensor value on the display 104;

user-interface elements 1930 arranged within the display area 1623 so as to cause the processing device to establish a functional relationship between distance sensing device 807 and the motor 206.

In this way, an intuitive user interface method is established that connects devices to devices and user-interface elements to devices in a common and seamless manner. The thus established relationships between inputs and outputs cause the processing device to cause control commands to be issued to the respective output functions/output devices in response to received inputs from the respective input functions/input devices whose associated user-interface elements are graphically connected to the corresponding user-interface elements representing the outputs.

The user-interface elements may include one or more connection points for connecting them to other user-interface elements causing a functional relationship between the function/devices represented by the elements. The connection points may correspond to the same or to alternative functional connections. For example, the connection points may be positioned at respective parts of the boundary of a graphical user-interface element and may be connectable from respective directions, e.g. as illustrated in FIG. 20.

Figure 20:
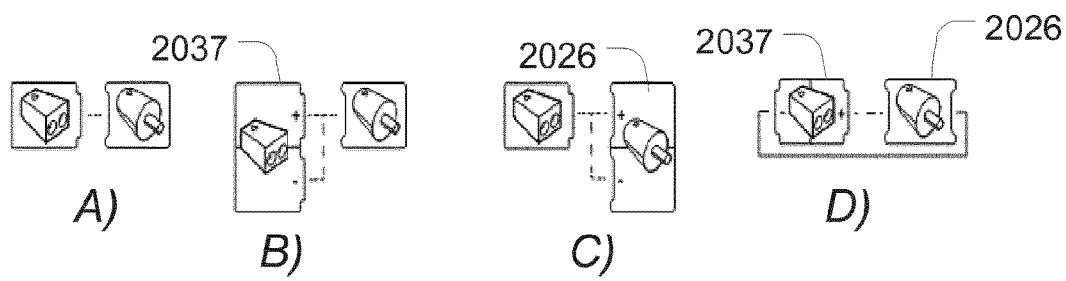
FIGS. 20A-D show examples of connections between user-interface elements.

FIG. 20 A shows user-interface elements allowing for a single connection.

FIG. 20B shows a user-interface element 2037 representing an input device, where the user-interface element 2037 allows for multiple connections.

FIG. 20C shows a user-interface element 2026 representing an output device, where the user-interface element 2026 allows for multiple connections.

Finally, FIG. 20D shows user-interface elements 2026 and 2037 representing an output and an input device, respectively, where both user-interface elements allow for multiple connections.

In addition to connecting single input elements to output elements, it may also be possible to use multiple connection areas such as illustrated in FIG. 20 to provide a means to connect multiple input and output elements such that a single input can influence multiple outputs.

In the examples of FIGS. 20B-D the multiple connections may represent the same function or differentiated functionality, such as an inverted functional relationship.

When positioned within the display area of a processing device, the proximity between user-interface elements representing inputs and outputs may influence the functional relationship between the inputs and outputs represented by the user-interface elements; in particular the proximity may influence a degree or strength of the functional connection; in the following, this effect is also referred to as proximity effect. The proximity effect may or may not be graphically represented. The graphical representation of the effect may also be a temporary such that this only appears when the user-interface elements representing an input and output are within a predefined proximity to one another. Similarly, the actual proximity effect may be temporary such that the graphic and effect is only present when the user-interface elements representing the input and output are initially positioned adjacent each other (with their respective connection points in contact with each other) and then being re-positioned as if to disconnect them. Actual disconnection may require re-positioning beyond a predetermined maximum distance. The initial positioning of the elements with their connection points in contact with each other may cause the processing device to establish a functional relationship between the corresponding input and output. The subsequent re-positioning at a distance from each other may then determine the magnitude of the proximity effect.

The proximity may control a predetermined parameter of the coupling between the input and the output, e.g. the speed at which a motor is driven, the volume or pitch of a generated sound, the intensity or color of generated light, etc. This proximity may be directly related to the functionality of a sensor or introduce an additional control effect. For example, a sensor may influence a motor speed and the proximity may further reduce the speed control level. Alternatively a sensor may control pitch of a sound output, and the proximity may control the volume.

The graphic and functional proximity effect may be limited to user-interface elements representing inputs, to user-interface elements representing outputs, or be present for both.

Figure 21:
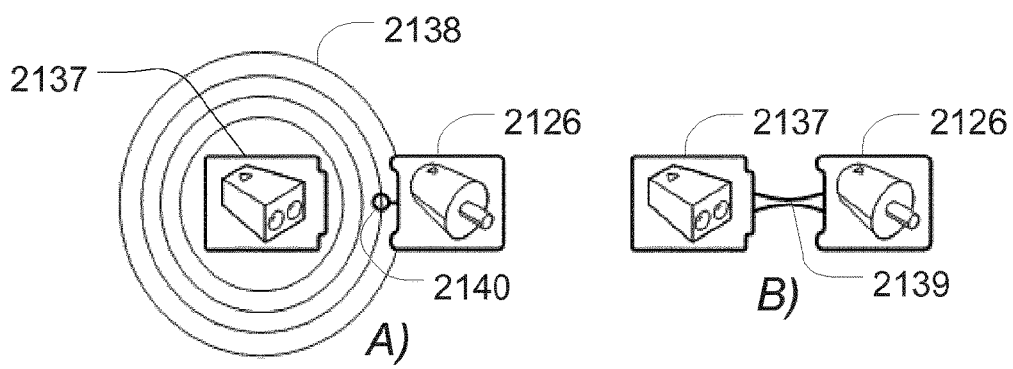
FIGS. 21A-B and 22-23 show examples of the graphical representation of the proximity effect.

FIG. 21A shows an example of the graphical representation of the proximity effect. In particular, FIG. 21A shows a user-interface element 2137 representing an input positioned at a certain distance from the user-interface element 2126 representing an output with which the user-interface element 2137 has been connected. Various distance zones around the user-interface element 2137 are represented by concentric rings 2138 around the user-interface element 2137. Activation of the input represented by element 2137 causes activation of the motor represented by element 2126, where the speed at which the motor is driven depends on the distance between elements 2137 and 2126. For example, the motor speed may be controlled in different discrete levels, depending on which of the rings 2138 a connection point 2140 of element 2136 is connected to. It will be appreciated that, in other examples, the distance between a user-interface element representing an input and a user-interface element representing an output may influence different control parameters for controlling the output or be a control parameter in itself. For example, the control parameter may be varied step-wise, depending on which distance zone around element 2137 the element 2126 is positioned in.

Figure 22:
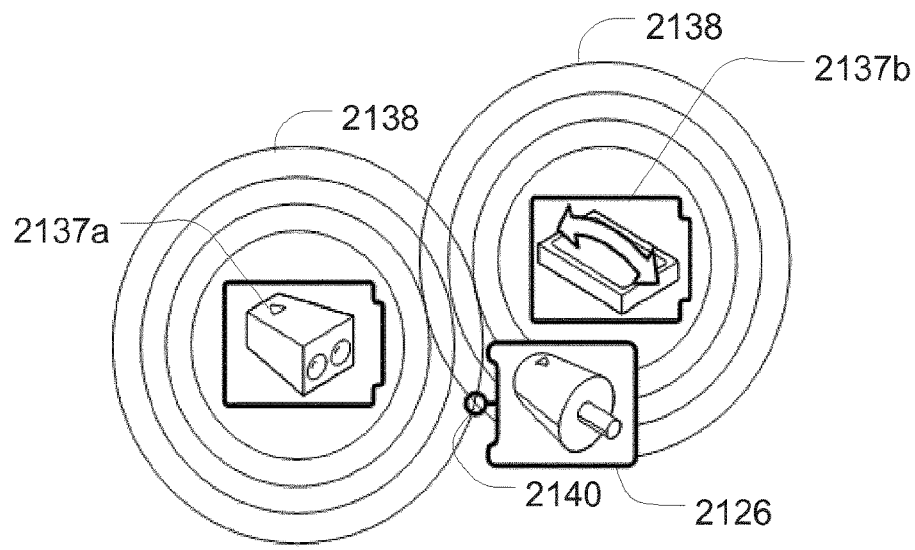

FIG. 21B shows another example of the graphical representation of the proximity effect. In the example, the coupling strength between input and output is represented by a connector element 2139 which is illustrated so as to simulate a rubber band that is stretched and gets thinner, the further the elements are moved away from each other. As in the previous example, the distance between the elements may control a magnitude of a control parameter controlling operation of the output device, e.g. the speed at which a motor is operated. In the example of FIG. 21B, the control parameter may be varied as a continuous function of the distance between the elements. The establishment of functional relationships by positioning user-interface elements within a proximity of another may be used so as to establish relationships between more than two user-interface elements, e.g. as illustrated in FIG. 22. The multiple elements may then influence each other at respective degrees as represented by the respective proximity to each other. In the example of FIG. 22, two user-interface elements 2137*a* and 2137*b* representing respective inputs are each related to a user-interface element 2126 representing an output. Hence, the output function represented by user-interface element 2126 is activated by activation of the input represented by user-interface element 2137a or by activation of user-interface element 2137b, but at different degrees, according to their respective distance from the connection point 2140 of element 2126. In some embodiments, if both inputs are activated, the total effect on the output function may be the combined effect, weighted by the respective distance, of both inputs.

Hence multiple user-interface elements may have functional influence on each other according to graphical proximity. This may for example permit an output value to be the sum or result of another combination of respective portions of two or more input devices.

Figure 23:
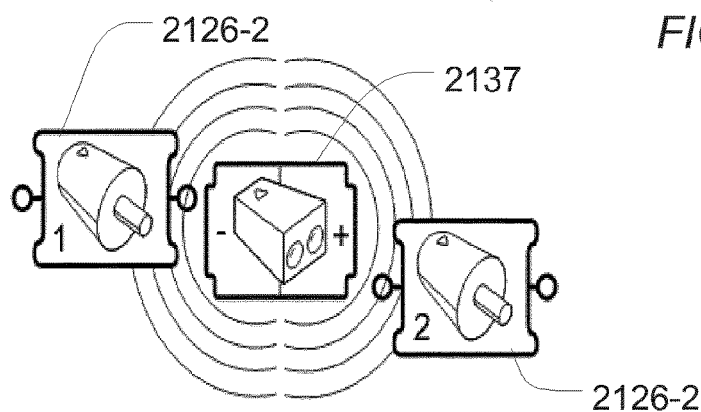

Similar to a user interface having multiple connection points that have differentiated functionality, these differentiated points may also include the proximity effect, e.g. as illustrated in FIG. 23. FIG. 23 shows a user-interface element 2137 having two connection points. User-interface elements 2126- and 2126-2 are connected to the respective connection points, but at respective distances. The two connection points of user-interface element 2137 and/or the user-interface elements 2126-1 and 2126-2 may have the same or different functionality.

In addition to user-interface elements representing inputs and outputs that can be connected with each other, there may be additional user-interface elements that can be graphically placed between input and output representations and that influence their functional relationship. Examples of such additional user-interface elements include elements for inverting, for setting a sensor value to activate an output at a set value, for time delays etc.

Figure 24:
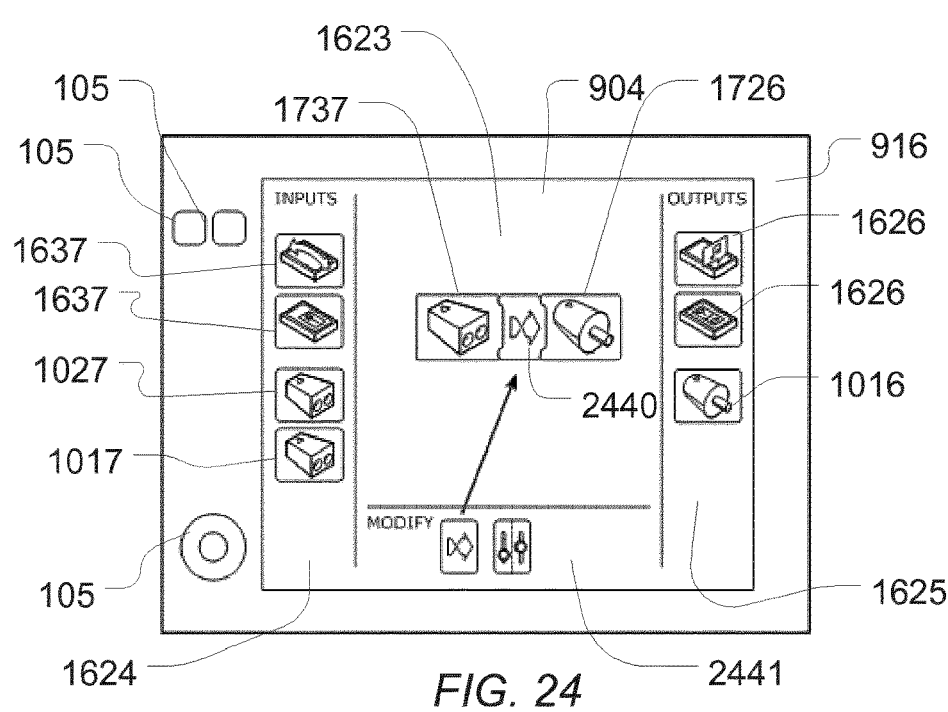
FIG. 24 and FIGS. 25A-B show the system of FIG. 16 in different operational states.

FIG. 24 shows the processing device of FIG. 17, but with an additional user interface area 2441 allowing a user to select additional user-interface elements. In the display area 1623 the user-interface elements 1737 and 1727 are shown connected via an intermediary user-interface element 2440 selected from the selection 2441. The placement of an intermediary user-interface element between an input and an output element may cause the processing device to establish a functional connection between the input and the output represented by the input and output elements, respectively, but where the functional connection is modified or influenced by a function represented by the intermediary user-interface element.

In some embodiments, the processing device may selectively be operated in different modes, e.g. a configuration or programming mode and in an execution or control mode. In the configuration mode, the processing device may provide a display environment and associated functionality that is focused on displaying, re-positioning and graphically connecting input and output representations, e.g. as described in the examples of FIGS. 16-24. In the execution mode, the processing device may provide an additional display environment and associated functionality that displays only the user interface control and output elements of the functions and inputs represented by the user-interface elements representing input and output functions. In the execution mode, the processing device may be operable to receive control input signals from input devices connected to the processing device and/or from internal inputs and issue control commands to connected output devices and/or internal outputs. The rules for which control commands to issue to which output in response to which input are defines by the user-interface elements positioned and mutually connected within the display area of the configuration mode.

The user interface control/output elements shown in the execution mode may be re-positioned and sized independently of their position in the configuration view.

Figure 25:
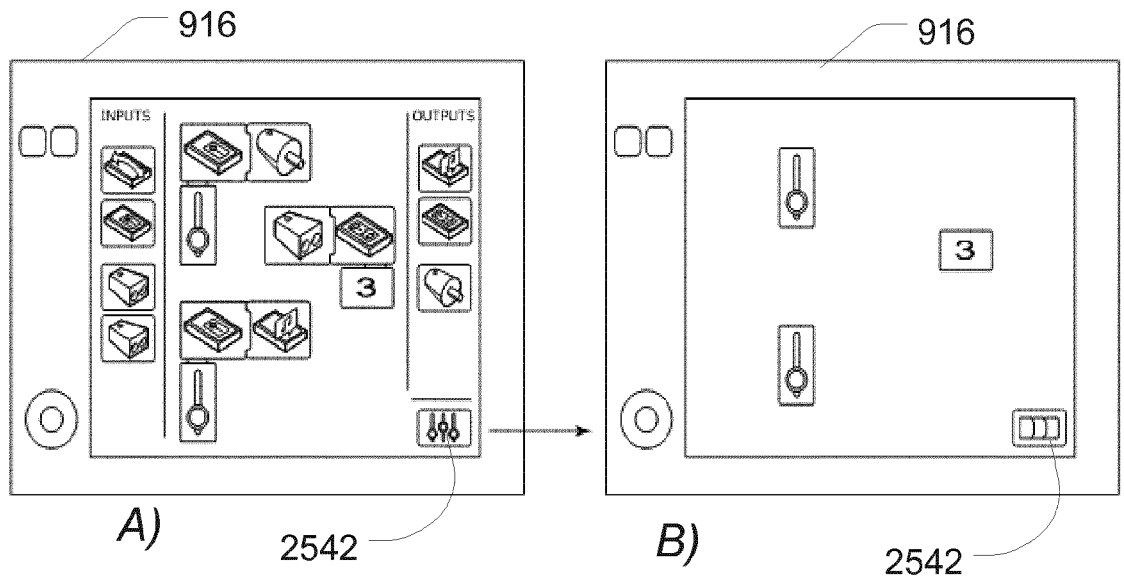

FIG. 25A shows the processing device 916 of FIG. 19 in the configuration mode as described in connection with FIG. 19. FIG. 25B shows the processing device in the execution/control mode. The user interface may include a toggle button 2542 or other input allowing a user to switch between the different modes.

The user interface environment may also offer user selections of background images/graphics and ability for a user to alter the design expression of the user-interface elements and add text/graphic labels to the user-interface elements. These graphical elements may be organized such that a user selects from a number of "theme" options, the "theme" includes background image, alternative graphic treatment of all user-interface elements in user interface environment.

The configuration and control/execution environments may be saved by a user such that a selected configuration may be re-established at a later time. This may also enable the sharing of a set configuration such that another user may re-create a similar configuration on a similar device.

Figure 26:
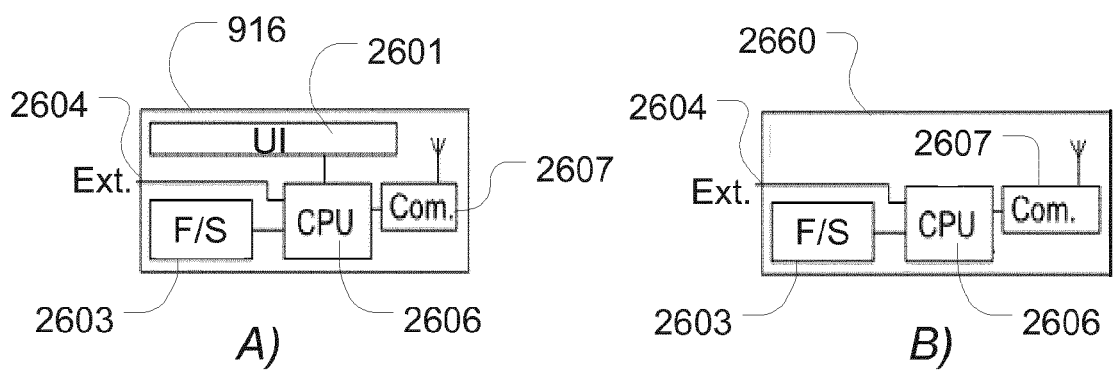
FIGS. 26A-B show schematic block diagrams of examples of electronic devices.

FIG. 26A-B show schematic block diagrams of examples of electronic devices.

FIG. 26A shows an example of a processing device 916 which comprises a wireless communication interface 2607 configured to provide a wireless connection to other electronic devices. The wireless connection may be used to exchange data including but not limited to the control of external actuators, the reading of sensors, 2-way voice communication, information for text of image reproduction, etc. The processing device further comprises a control circuit 2606, a user interface 2601 and, optionally, one or more internal devices 2603 such as one or more function devices for implementing one or more sets of local functions and/or one or more sensors for receiving respective sensor inputs. The control circuit 2606 may be a microcontroller, a microprocessor, or other suitable processing unit, operably connected to the user interface, the wireless communications interface and the internal device(s). The wireless communications interface may comprise a transceiver connected to the control circuit and operable for radio-frequency communication with other electronic devices. The transceiver may be operable to transmit and receive radio-frequency signals in a suitable frequency band, e.g. in one of the ISM bands used for short-range communications technology. In fact the radio-frequency communication may utilise any suitable communications technology for communicating data, such as Bluetooth, IEEE 802.15.4, IEEE 802.11, ZigBee, Wifi, etc. It will be appreciated, however, that other communications technologies may be used, including technologies based on light, such as infrared light, or another wireless technology.

The processing device may further comprises a battery or other suitable power source, for providing power to the control circuit, the function device, the user interface and the communications interface. The processing device further comprises a housing which accommodates the control circuit, the communications interface and, optionally the internal function device and/or sensor. The processing device may further comprise one or more interfaces 2604, such as I/O ports, for providing wired connections to other devices such as external sensors or function devices.

The user interface 2601 comprises a graphical user interface operable to provide functionality allowing a user to configure a network of electronic devices and to establish functional relationships between input and output functions as described herein. It will be appreciated that the user interface may comprise additional user-interface elements, e.g. for controlling other functions of the processing device or of external devices.

In some embodiments, upon activation of a processing device, the control circuit of the processing device may activate the transceiver of the processing device and detect whether any other, compatible electronic devices are within the communication range of the processing device. To this end, a number of suitable detection mechanisms may be used. For example, each electronic device may, while activated, periodically broadcast identification signals such as identification messages including information such as its operational mode (e.g. "connected", "unconnected" and/or the like), a device ID and/or a type identifier e.g. identifying whether the electronic device is an output electronic device or an input electronic device or even which type of function/control element, i.e. which type of function device or sensor it comprises.

The user of the processing device 916 may then initiate establishment of a wireless connection and configure functional relationships between the detected devices and/or with internal functionality of the processing device, as described herein.

FIG. 26B shows an example of an input and/or output device 2660. The device of FIG. 26B may be similar to the processing device of FIG. 26A in that it comprises a communications interface 2607, a control circuit 2606 and one or more internal devices 2603, such as one or more function devices for implementing one or more sets of local functions and/or one or more sensors for receiving respective sensor inputs, all as described in connection with FIG. 26A. The device 2660 may further comprise one or more of the following: a battery or other energy source, a user interface, e.g. to set up a wireless connection with other devices, an I/O port for wired connections.

Figure 27B:
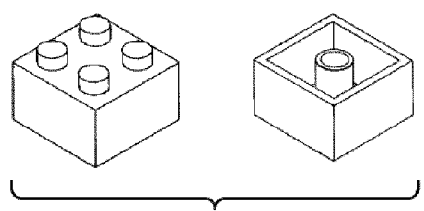
Figure 27B:
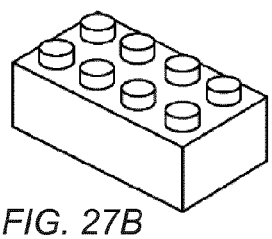
Figure 27C:
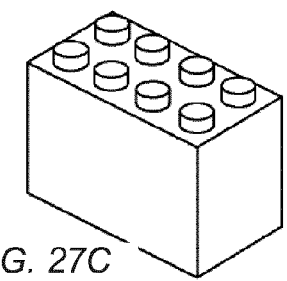

FIGS. 27A-C show examples of toy construction elements. In particular, FIG. 27A shows a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005,282. FIGS. 27B-C show other such prior art construction elements. The electronic devices shown in the previous figures may be interactive construction elements having this known type of coupling members in the form of cooperating studs and cavities. However, other types of coupling members may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of coupling members at coupling locations defining a regular planar grid allow the toy construction elements to be interconnected in a discrete number of positions and orientations relative two each other, in particular at right angles with respect to each other.

Embodiments of the control circuits of the electronic devices described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

What is claimed is:

1. A method for varying play with electronic toys by establishing, with a processing device, a functional relation between a control input and a controllable function for the electronic toys, the method comprising:

providing a graphical user interface including a display area, the display area having a boundary that is smaller than that of the graphical user interface;

selecting a first user-interface element from a set of user-interface elements, and positioning said first user-interface element within the display area, the first user-interface element representing a graphical representation of a first electronic toy configured to generate the control input;

selecting a second user-interface element from a set of user-interface elements, wherein the second user-interface element represents a second electronic toy configured to perform the controllable function in response to a control signal;

physically connecting at east one of the first and second electronic toys with a plurality of construction toy elements;

re-positioning said first user-interface element at a first position within the display area and/or re-positioning said second user-interface element at a second position within the display area, at a distance from the first user-interface element such that the first and second user-interface elements do not touch or overlap one another; and issuing to the second electronic toy, responsive to the control input of the first electronic toy, the control signal, wherein the control signal is a function of the control input and the distance between the first and second positions relative to one another within the boundary of the display area, and wherein a strength or degree of the control signal is affected by the distance between the first and second positions relative to one another, and wherein the second user-interface element is combinable with one or more user-interface elements such that the second interface element and the one or more user-interface elements influence each other at respective degrees represented by their respective proximity to each other to vary the control signal, and thus the controllable function to enhance play with the first and second electronic toys.

2. The method according to claim 1, wherein the first and second user-interface elements are connected by a connector user-interface element representing: a functional connection between the input signal of the first electronic toy and the controllable function; and a physical connection between the first and second electronic toys.

3. The method according to claim 1, wherein positioning the first and/or the second user-interface element comprises receiving a user input indicative of a functional connection between the input signal of an input device of the first electronic toy and the controllable function, and providing an indication that the first and second user-interface elements are functionally connected with each other.

4. The method according to claim 3, wherein positioning the first and second user-interface elements comprises:
- initially positioning the first and second user-interface elements in a predetermined initial spatial relationship with each other;
- responsive to the first and second user-interface elements being positioned in the predetermined initial spatial relationship with each other, establishing a functional relationship between the input signal of the input device and the controllable function; and
- re-positioning at least one of the first and second user-interface elements resulting in the first user-interface element being positioned at the first position and the second user-interface element at the second position at a distance from the first position.

5. The method according to claim 1, wherein the controllable function comprises one or more of speed at which a motor is driven, volume or pitch of a sound, and intensity or color of a light.

6. The method according to claim 1, wherein: the first electronic toy includes at least one button, a slider control, a distance sensor, a microphone and/or a display; the second electronic toy includes a display, a speaker, and/or a drive motor; and at least one of the first and second electronic toys includes coupling studs and a cavity for selective engagement of the coupling studs.

7. The method according to claim 1, wherein the first and second electronic toys are integral in a single housing.

* * * * *